United States Patent [19]

Beauch et al.

[11] Patent Number: 5,423,722
[45] Date of Patent: Jun. 13, 1995

[54] A STEERING SHAFT

[75] Inventors: Howard D. Beauch, Frankenmuth; Thomas J. Milton, Bay City, both of Mich.

[73] Assignee: General Motors Corporation, Detroit, Mich.

[21] Appl. No.: 67,928

[22] Filed: May 27, 1993

[51] Int. Cl.6 ............................................. F16D 3/50
[52] U.S. Cl. ........................................ 464/151; 403/74; 464/147
[58] Field of Search ............... 464/151, 147, 903, 900; 403/74, 57

[56] References Cited

U.S. PATENT DOCUMENTS

| | | | |
|---|---|---|---|
| 3,167,971 | 2/1965 | Zeigler et al. | 74/493 |
| 3,298,241 | 1/1967 | Rise | 74/493 |
| 3,376,713 | 4/1968 | Runkle | 464/139 |
| 3,451,228 | 6/1969 | Henley | 464/903 |
| 4,331,003 | 5/1982 | Peterson | 464/76 |
| 4,834,658 | 5/1989 | Kotani et al. | 439/8 |
| 4,921,470 | 5/1990 | Kotani et al. | 464/151 |
| 4,941,766 | 7/1990 | Carlson | 403/131 |

Primary Examiner—Daniel P. Stodola
Assistant Examiner—Eileen A. Dunn
Attorney, Agent, or Firm—Saul Schwartz

[57] ABSTRACT

A universal joint between an upper steering shaft and a lower steering shaft in a tilt-adjustable motor vehicle steering column includes a pair of bifurcated yokes formed to near-net-shape integrally with the upper and lower shafts, a plastic jacket molded in-situ on each of the bifurcated yokes, and a plastic centering sphere. Each of the plastic jackets has a pair of exposed, frusto-conical bearing surfaces molded thereon which slidably engage corresponding frusto-conical side walls of cross grooves in the plastic centering sphere.

2 Claims, 3 Drawing Sheets

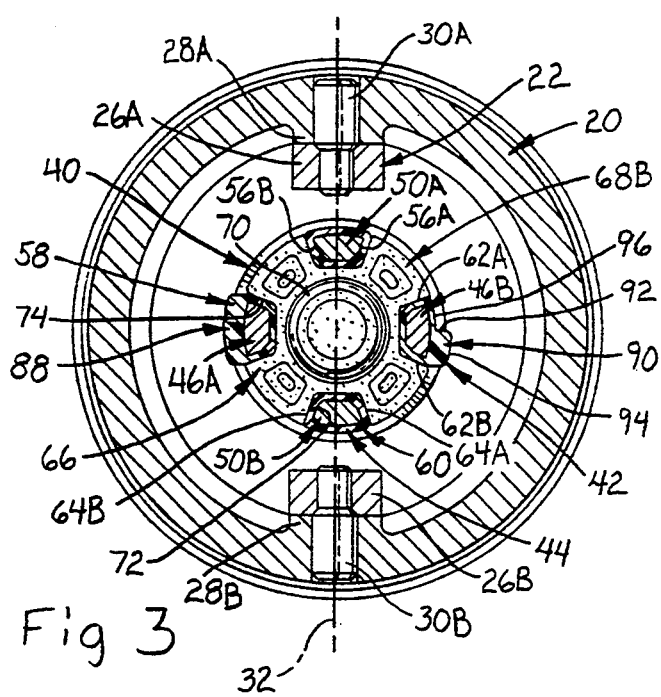
Fig 3
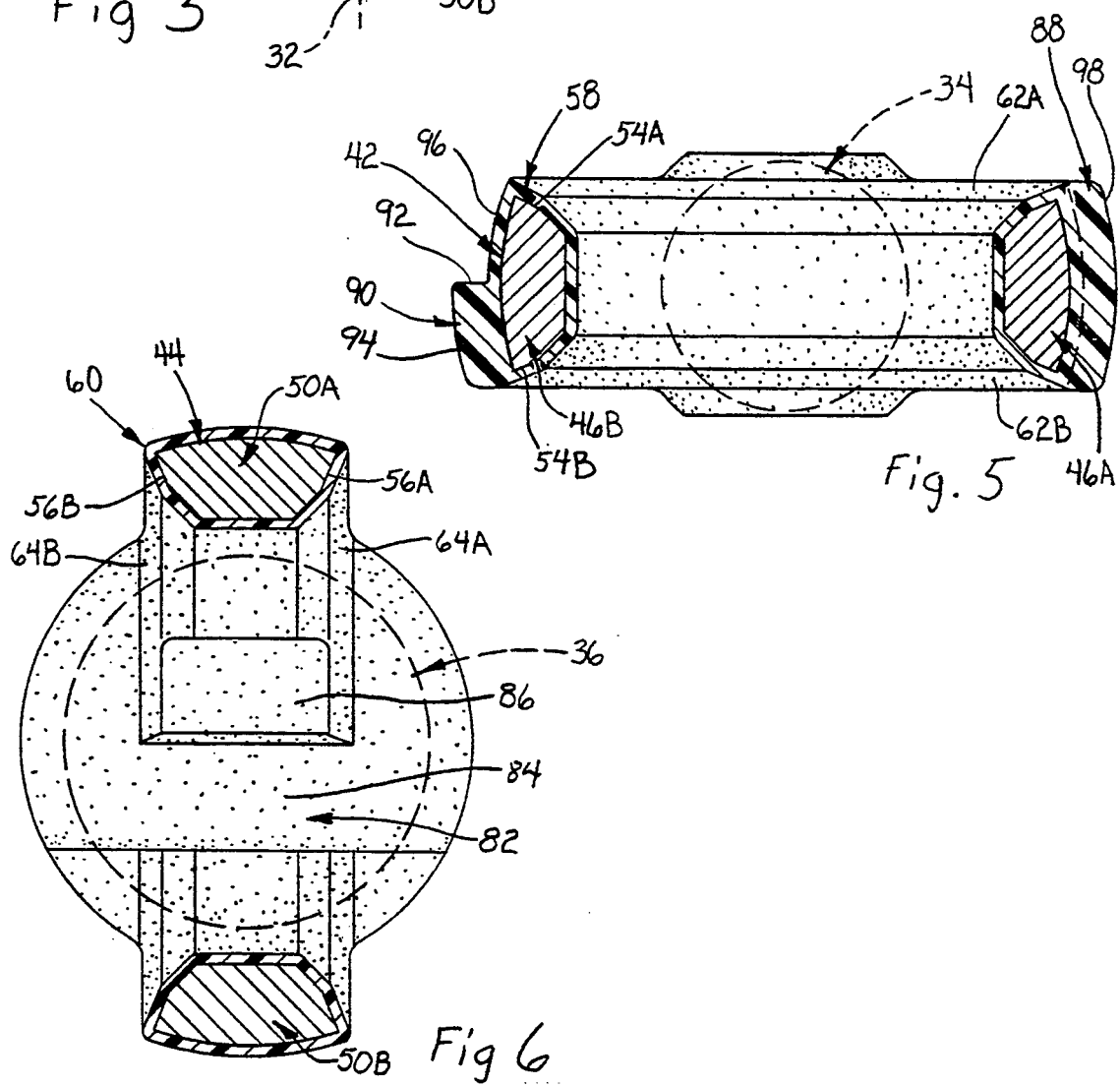
Fig. 5
Fig 6

A STEERING SHAFT

FIELD OF THE INVENTION

This invention relates to tilt-adjustable steering columns for motor vehicles.

BACKGROUND OF THE INVENTION

In a widely available tilt-adjustable motor vehicle steering column, a bearing support or tilt housing is mounted on a stationary tubular mast jacket for up and down pivotal movement about a horizontal axis. A steering shaft assembly of the column includes an upper shaft rotatably supported on the tilt housing, a lower shaft rotatably supported on the mast jacket, and a universal joint therebetween. The universal joint includes bifurcated yokes on the upper and lower shafts and a plastic centering sphere between the yokes. Each of the yokes has frusto-conical bearing surfaces machined on opposite sides thereof which bearing surfaces seat in correspondingly shaped cross grooves in the centering sphere. The bearing surfaces slide relative to the sides of the cross grooves when the steering shaft assembly is rotated with the tilt housing articulated relative to the mast jacket. A steering shaft universal joint according to this invention is an improvement relative to the aforesaid universal joints having machined bearing surfaces.

SUMMARY OF THE INVENTION

This invention is a new and improved steering shaft universal joint for a tilt adjustable motor vehicle steering column of the type including a lower steering shaft rotatably supported on a mast jacket of the steering column and an upper steering shaft rotatably supported on a tilt housing of the steering column. The universal joint according to this invention includes a cross grooved plastic centering sphere and a bifurcated yoke on each of the upper and lower steering shafts. Each yoke has a pair of frusto-conical wall portions on opposite sides thereof characterized as near-net-shape, i.e. formed integrally with the shafts by a method, such as forging, which is not capable of consistently achieving dimensional tolerances within ranges comparable to ranges achieved by machining in the prior steering shaft universal joints. The universal joint according to this invention further includes an in-situ molded plastic jacket over each of the frusto-conical wall portions of the bifurcated yokes which jackets define a pair of frusto-conical bearing surfaces on opposite sides of the corresponding yoke. The physical dimensions of the molded bearing surfaces are consistently within tolerance ranges comparable to ranges achieved by machining the same features in prior steering shaft universal joints but do not require repetitive machining of individual yokes. In a preferred embodiment, the in-situ molded plastic jackets further include structural features which assure assembly of the upper and lower steering shafts in only a predetermined relationship.

BRIEF DESCRIPTION OF THE DRAWINGS

FIG. 3 is a sectional view taken generally along the plane indicated by lines 3—3 in FIG. 2;

FIG. 5 is a sectional view taken generally along the plane indicated by lines 5—5 in FIG. 4; and FIG. 6 is a sectional view taken generally along the plane indicated by lines 6—6 in FIG. 4.

DESCRIPTION OF A PREFERRED EMBODIMENT

Figure 1:
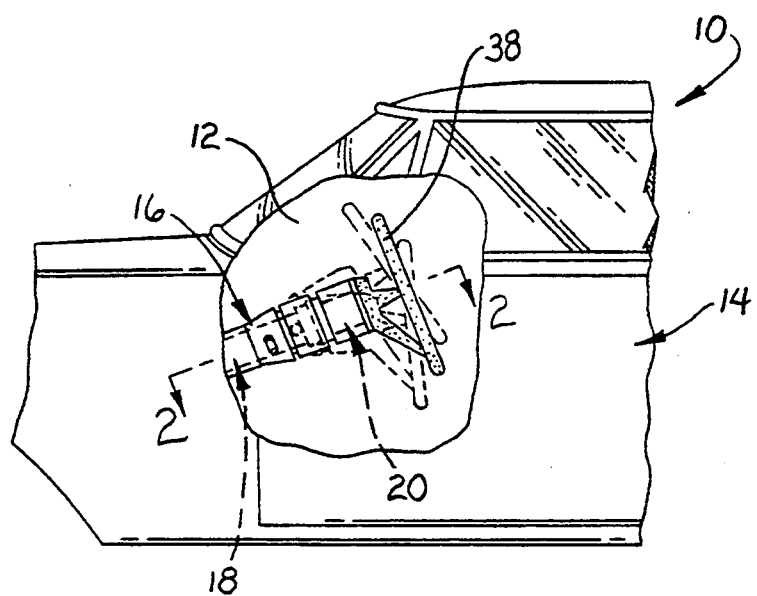
FIG. 1 is a fragmentary, partially broken-away view of a motor vehicle having a tilt-adjustable steering column including a steering shaft universal joint according to this invention.
Figure 2:
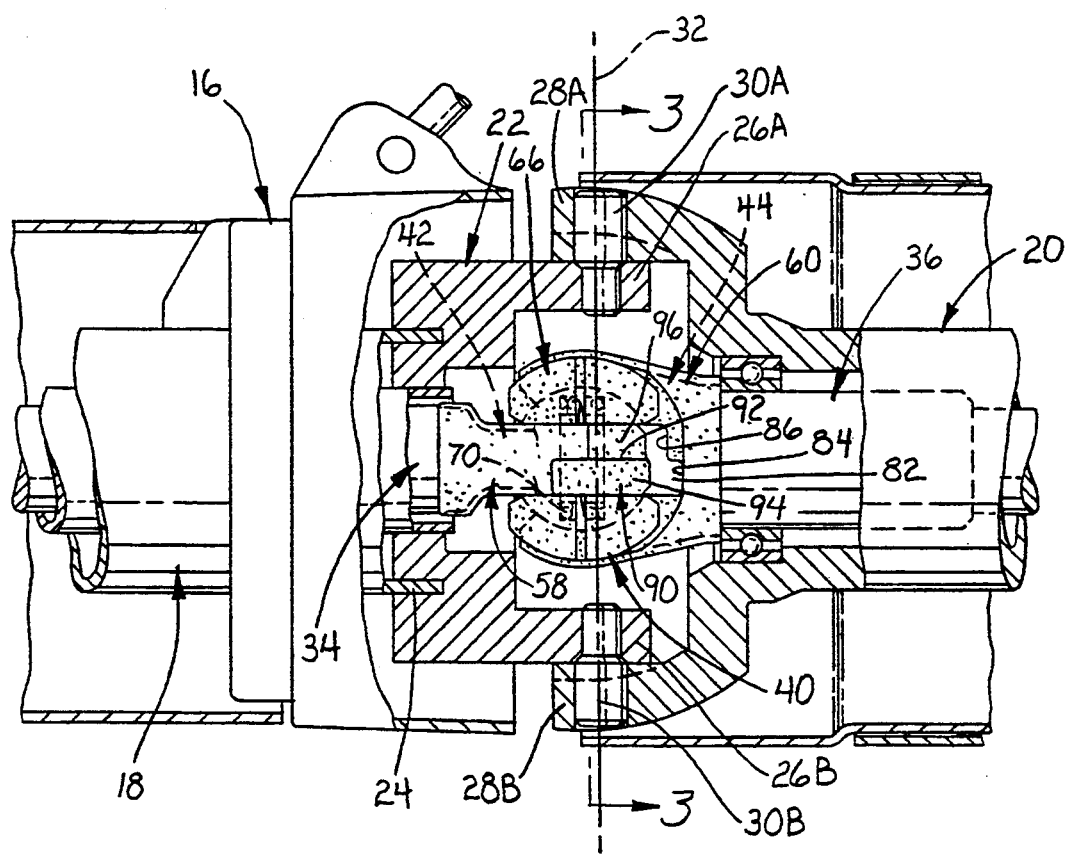
FIG. 2 is an enlarged partially broken-away view taken generally along the plane indicated by lines 2—2 in FIG. 1.

Referring to FIGS. 1 and 2, a motor vehicle 10 has a passenger compartment 12 defined within a body 14 of the vehicle. A tilt-adjustable steering column 16 in the passenger compartment includes a stationary tubular mast jacket 18 and a tilt housing 20. A schematically represented support 22 is rigidly attached to an upper end 24 of the mast jacket and includes a pair laterally spaced lugs 26A-B. The tilt housing 20 has a corresponding pair of laterally spaced lugs 28A-B connected to the lugs 26A-B on the support 22 through a pair of pivot pins 30A-B whereby the tilt housing is mounted on the mast jacket for up and down pivotal movement about a horizontal axis 32 of the steering column. The tilt housing has a plurality of articulated positions, shown in broken lines in FIG. 1, relative to the mast jacket and a center position, shown in solid lines in FIG. 1, in which the tilt housing and mast jacket are linearly aligned.

A steering shaft assembly of the steering column 16 includes a first or lower steering shaft 34 rotatably supported on the stationary mast jacket 18 and a second or upper steering shaft 36 rotatably supported on the tilt housing 20. A steering wheel 38, FIG. 1, is attached to an outboard end, not shown, of the upper steering shaft 36 and is pivotable up and down with the tilt housing and the upper steering shaft. A steering shaft universal joint 40 according to this invention is disposed between the upper and lower steering shafts 36,34.

Referring to FIGS. 2-6, the universal joint 40 includes a first yoke 42 forged or otherwise formed integrally on an end of the lower steering shaft 34 and a second yoke 44 forged or otherwise formed integrally on an adjacent end of the upper steering shaft 36. The first yoke 42 has a pair of arc-shaped arms 46A-B in a common longitudinal plane of the lower steering shaft which open toward the second yoke 44 and which terminate at a pair of distal ends 48A-B, respectively. The distal ends 48A-B are separated by a span S1, FIG. 4, in the plane of the arms 46A-B.

The second yoke 44 has a pair of arc-shaped arms 50A-B in a common longitudinal plane of the upper steering shaft angularly separated relative to the plane of the arms 46A-B of the first yoke 42 by about 90 degrees. The second yoke 44 opens toward the first yoke and the arms 50A-B terminate at a pair of distal ends 52A-B, respectively. The distal ends 52A-B are separated by a span S2, FIG. 4, in the plane of the arms 50A-B equal to the span S1.

Figure 4:
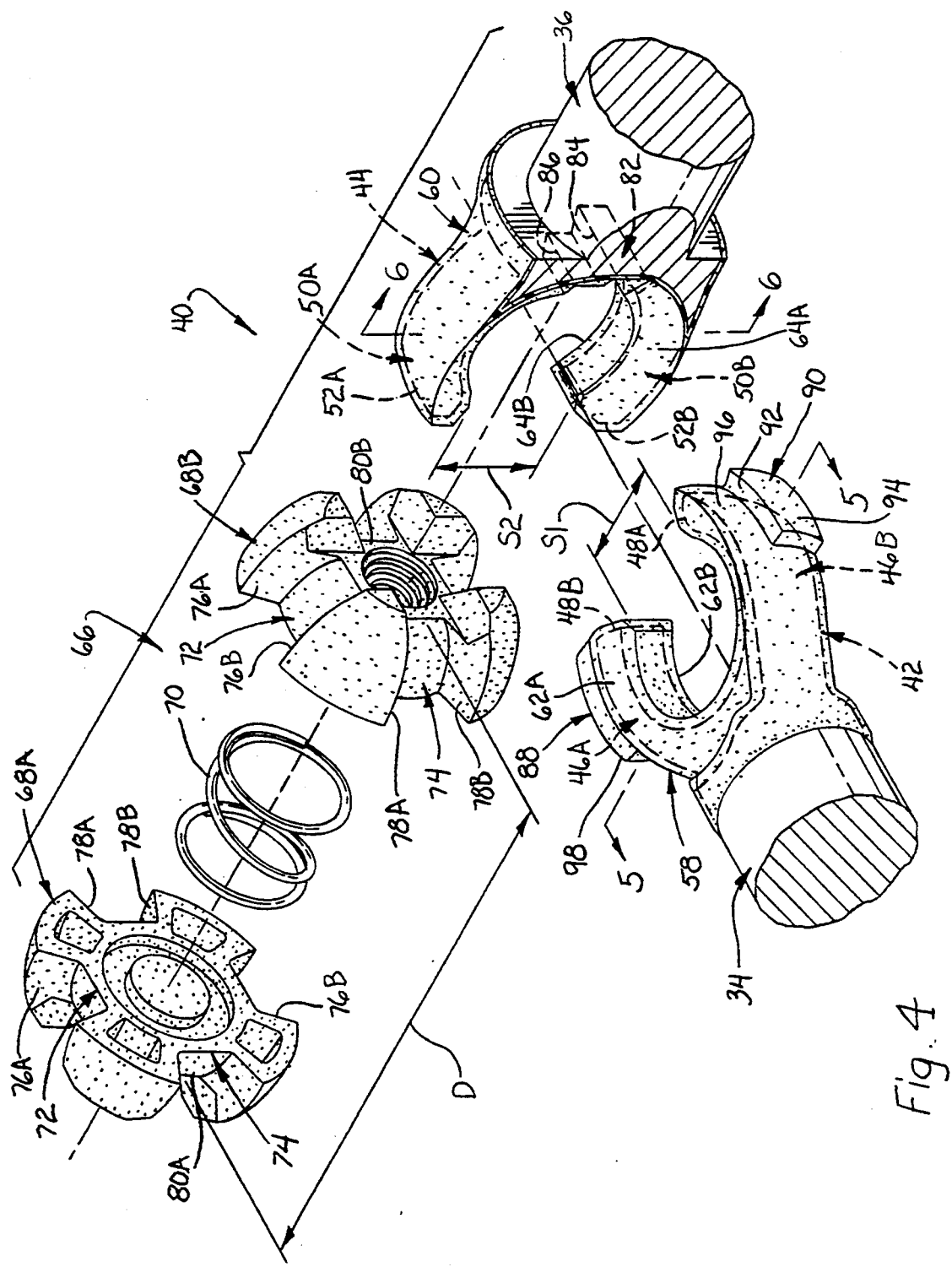
FIG. 4 is an exploded perspective view of a portion of a steering shaft universal joint according to this invention.

As seen best in FIGS. 4-6, a pair of generally frusto-conical walls 54A-B are formed on opposite sides of the first yoke 42 when the latter is forged or otherwise formed integrally with the first shaft 34. The walls 54A-B extend around the yoke 42 from the distal end 48A of the arm 46A to the opposite distal end 48B of the arm 46B. Similarly, a pair of generally frusto-conical walls 56A-B are formed on opposite sides of the second yoke 44 when the latter is forged or otherwise formed integrally with the second shaft 36. The walls 56A-B extend around the yoke 44 from the distal end 52A of the arm 50A to the opposite distal end 52B of the arm 50B.

The yokes 42,44 are formed integrally with the shafts 34,36, respectively, to near-net-shape physical dimensions. That is, forging or a similar method of forming the arms 46A-B,50A-B also simultaneously forms the walls 54A-B,56A-B. The walls 54A-B,56A-B are similar to the bearing surfaces of prior steering shaft universal joints, but have physical dimensions that necessarily vary within tolerance ranges exceeding the ranges characteristic of the machined bearing surfaces of the aforesaid prior steering shaft universal joints. Such forming methods are, therefore, not capable of directly forming acceptable bearing surfaces on yokes of steering shafts.

As seen best in FIGS. 4-6, a first plastic jacket 58 is disposed over the first yoke 42 and a second plastic jacket 60 is disposed over the second yoke 44. The first jacket 58 includes a pair of exposed frusto-conical bearing surfaces 62A-B over the frusto-conical walls 54A-B, respectively. The second jacket 60 includes a pair of exposed frusto-conical bearing surfaces 64A-B over the frusto-conical walls 56A-B, respectively.

The jackets 58,60 are molded in-situ, i.e. directly over the yokes 42-44, by mounting the yokes in molding cavities of injection molding apparatus, not shown, and injecting plastic around the yokes. The physical dimensions of the molding cavities are within tolerance ranges comparable to the ranges of machined bearing surfaces of prior steering shaft universal joints. Accordingly, the molded plastic bearing surfaces 62A-B,64A-B of the jackets 58,60, respectively, likewise have physical dimensions varying only within the same narrower tolerance range. In an experimental embodiment, Nylon in-situ molded around steel yokes.

In-situ molding of the plastic jackets 58,60 over near-net-shape steel yokes is an important feature of this invention. The combination of these manufacturing methods, i.e. forming near-net-shape yokes and in-situ molding plastic jackets over the yokes with more precise physical dimensions, affords valuable manufacturing economies through avoidance of relatively expensive machining operations.

The universal joint 40 further includes a plastic centering sphere 66 consisting of a pair of hemispherical segments 68A-B and a spring 70 between the segments, FIG. 4. The centering sphere 66 has a pair of outside cross grooves 72,74 therein each having a pair of generally frusto-conical side walls 76A-B and 78A-B, respectively. The cross grooves 72,74 are disposed in perpendicular planes through the geometric center of the centering sphere.

The arms 46A-B on the first yoke seat in groove 74 with the side walls 78A-B of the groove in sliding engagement on the frusto-conical bearing surfaces 62A-B, respectively, on the yoke. Similarly, the arms 50A-B on the second yoke seat in second groove 72 with the side walls 76A-B of the groove in sliding engagement on the frusto-conical bearing surfaces 64A-B on the yoke. For assembly, as described below, the cross grooves 72,74 terminate at a pair of planar lands 80A-B at opposite ends of the centering sphere separated by a dimension D less than the spans 51,52 between the distal ends of the arms of the yokes 42,44, respectively.

In conventional fashion, the centering sphere transfers steering torque from the first shaft to the second shaft throughout the range of articulated positions of the tilt housing 20 relative to the mast jacket 18. Whenever the tilt housing is articulated relative to the mast jacket, rotation of the steering shafts 34,36 is accompanied by relative sliding movement between the frusto-conical bearing surfaces 62A-B,64A-B on the plastic jackets 58,60 and the corresponding side walls 78A-B,-76A-B of the cross grooves 74,72 on the centering sphere. The spring 70 urges the hemispherical segments 68A-B in opposite directions to maintain intimate contact between the side walls of the cross grooves and the frusto-conical bearing surfaces.

As seen best in FIGS. 2-6, the plastic jacket 60 on the yoke 44 has a deep section 82 where the arms 50A-B converge. The plastic jacket is molded such that the deep section 82 has a deep slot 84 and a shallow slot 86 therein adjacent the deep slot. Both slots 84,86 extend across the yoke 44 perpendicular to the plane of the arms 50A-B.

The depth or thickness of the plastic jacket 58 over the yoke 42 increases on the arms 46A-B toward the distal ends 48A-B so that a pair of raised bosses 88,90, respectively, are formed at the distal ends 48A-B. The raised boss 90 has a shoulder 92 in the plane of the yoke between a first outer surface 94 and a second outer surface 96 of the plastic jacket 58. The shape of the raised boss 90 is complementary to the shape of the deep slot 84 and the shallow slot 86 in the deep section 82 of the plastic jacket 60. The raised boss 88 has an outer surface 98 which extends across the width of the arc-shaped arm 46A and which is adapted to interfere with an edge of the shallow slot 86 to prevent assembly of the universal joint 40 except in a predetermined angular phase relationship between the shafts 34,36 as described below.

In assembling the steering shaft universal joint 40, the centering sphere 66 is installed on one or the other of the yokes 42,44 and then the other yoke installed on the centering sphere. For example, the centering sphere 66 is inserted between the arms 50A-B of the yoke 44 by passing the planar lands 80A-B between the distal ends 52A-B of the yoke. When the side walls 76A-B of the groove 72 are seated against the frusto-conical bearing surfaces 64A-B, the centering sphere is rotated about 90 degrees until the planar land 80A faces the deep section 82 of the plastic jacket 60 and the planar land 80B faces the distal ends 52A-B of the yoke.

The shaft 34 is positioned substantially perpendicular to the shaft 36, FIG. 4, with the plane of the yoke 42 perpendicular to the planar lands 80A-B. Importantly, the arm 46B is aligned with the deep section 82 of the plastic jacket 60 so that the first and second outer surfaces 94,96 are in register with the deep and shallow slots 84,86, respectively. The distal ends 48A-B of the yoke 42 are advanced over the planar lands 80A-B with the deep slot receiving the first outer surface 94 and the shallow slot receiving the second outer surface 96.

When the frusto-conical bearing surfaces 62A-B seat against the side walls 78A-B of the groove 74, the shaft 34 is pivoted about the centering sphere 66 toward linear alignment with the shaft 36. During such pivotal movement, the bearing surfaces 62A-B slide relative to the side walls 78A-B of the groove 74 and the distal ends 48A-B of the arms 46A-B are removed from alignment with the planar lands 80A-B of the centering sphere so that dislodgement of the second shaft from the first shaft is foreclosed.

If installation of the shaft 34 on the centering sphere 66 is attempted with the arm 46A of the yoke 42 aligned with the deep section 82 of the plastic jacket 60, the outer surface 98 on the boss 88 interferes with an edge of the shallow slot 86 before the bearing surfaces on the jacket 58 achieve seated positions on the side walls of the groove 74. In that circumstance, it is not possible to assemble the universal joint 40. Accordingly, the shafts 34,36 may be assembled in only one relative or angular phase relationship.

The embodiments of the invention in which an exclusive property or privilege is claimed are defined as follows:

1. A steering shaft comprising:
   a first shaft,
   a second shaft,
   a first bifurcated yoke at an end of said first shaft including a pair of arc-shaped arms formed integrally with said first shaft terminating at respective ones of a pair of distal ends separated by a first span,
   a first pair of frusto-conical walls on opposite sides of said first bifurcated yoke on each of said arc-shaped arms thereof,
   a second bifurcated yoke at an end of said second shaft including a pair of arc-shaped arms formed integrally with said second shaft terminating at respective ones of a pair of distal ends separated by a second span equal to said first span,
   a second pair of frusto-conical walls on opposite sides of said second bifurcated yoke on each of said arc-shaped arms thereof,
   a first plastic jacket molded in-situ on said first bifurcated yoke and defining on opposite sides thereof a first pair of exposed frusto-conical bearing surfaces on said first pair of frusto-conical walls,
   a second plastic jacket molded in-situ on said second bifurcated yoke and defining on opposite sides thereof a second pair of exposed frusto-conical bearing surfaces on said second pair of frusto-conical walls,
   a centering sphere between said first and said second bifurcated yokes including a first hemispherical segment and a second hemispherical segment and a spring therebetween,
   said centering sphere having a first cross groove therein with a pair of frusto-conical side walls slidably engaged on respective ones of said first pair of frusto-conical bearing surfaces and a second cross groove therein perpendicular to said first cross groove with a pair of frusto-conical side walls slidably engaged on respective ones of said second pair of frusto-conical bearing surfaces,
   said centering sphere having a pair of parallel planar lands thereon at the intersections of said first and said second cross grooves and said planar lands being separated from each other by a dimension less than said first and said second spans so that said centering sphere fits between said distal ends of each of said pairs of arc-shaped arms on said first and said second bifurcate yokes, the spring urges relative linear separation between said first and said second hemispherical segments thereby to bias said frusto-conical side walls of said first and said second cross grooves into sliding engagement on corresponding ones of said and second pairs of exposed frusto-conical bearing surfaces, and
   a keying mechanism molded integrally on each of said first and said second plastic jackets interfering with each other to prevent passage of said planar lands of said centering sphere between said distal ends of said arc-shaped arms of said first bifurcated yoke subsequent to passage of said planar lands of said centering sphere between said distal ends of said arc-shaped arms of said second bifurcated yoke except in a predetermined angular phase relationship between said first shaft and said second shaft.

2. The steering shaft recited in claim 1 wherein said keying means includes:
   a deep section on said second plastic jacket generally at the convergence of said pair of arc-shaped arms on said second bifurcated yoke,
   an asymmetric slot in said deep section,
   a first raised boss integral with said first plastic jacket generally at said distal end of a first one of said pair of arc-shaped arms on said first bifurcated yoke complimentary in shape to the shape of said asymmetric slot to avoid interference therewith, and
   a second raised boss integral with said first plastic jacket generally at said distal end of a second one of said pair of arc-shaped arms on said first bifurcated yoke having a shape adapted to interfere with an edge of said asymmetric slot.

* * * * *